US010077387B2

(12) United States Patent
Ding et al.

(10) Patent No.: US 10,077,387 B2
(45) Date of Patent: Sep. 18, 2018

(54) EMULSION TYPE SILICONE PRESSURE SENSITIVE ADHESIVE COMPOSITION AND PROCESS FOR THE PRODUCTION THEREOF

(71) Applicants: Dow Corning Corporation, Midland, MI (US); Dow Corning (China) Holding Co., Ltd., Shanghai (CN)

(72) Inventors: Li Ding, Shanghai (CN); Fuming Huang, Shanghai (CN); Chung Mien Kuo, Chungli (CN); Zhihua Liu, Shanghai (CN)

(73) Assignees: Dow Silicones Corporation, Midland, MI (US); Dow (Shanghai) Holding Co., Ltd., Shanghai (CN)

( * ) Notice: Subject to any disclaimer, the term of this patent is extended or adjusted under 35 U.S.C. 154(b) by 97 days.

(21) Appl. No.: 15/321,294

(22) PCT Filed: Jun. 25, 2015

(86) PCT No.: PCT/CN2015/082276
§ 371 (c)(1),
(2) Date: Dec. 22, 2016

(87) PCT Pub. No.: WO2015/197004
PCT Pub. Date: Dec. 30, 2015

(65) Prior Publication Data
US 2017/0137678 A1   May 18, 2017

(30) Foreign Application Priority Data

Jun. 26, 2014  (WO) ................ PCT/CN2014/080788

(51) Int. Cl.
*C09J 183/04*   (2006.01)
*C09J 11/08*    (2006.01)

(52) U.S. Cl.
CPC ............. *C09J 183/04* (2013.01); *C09J 11/08* (2013.01)

(58) Field of Classification Search
None
See application file for complete search history.

(56) References Cited

U.S. PATENT DOCUMENTS 3,784,479 A * 1/1974 Keil ................... B01D 19/0404
516/118
3,984,347 A * 10/1976 Keil ................... B01D 19/0409
516/118
(Continued)

FOREIGN PATENT DOCUMENTS

CN   101177596 A   5/2008
CN   102224188 A   10/2011
(Continued)

OTHER PUBLICATIONS

English language abstract and machine translation for DE2449085 (A1) extracted from http://worldwide.espacenet.com database on Apr. 5, 2018, 15 pages.
(Continued)

*Primary Examiner* — Robert S Loewe
(74) *Attorney, Agent, or Firm* — Warner Norcross & Judd LLP

(57) ABSTRACT

Disclosed is an emulsion type silicone pressure sensitive adhesive composition and a process for the production thereof. Also provided is an emulsion type silicone pressure sensitive adhesive composition, comprising: (A) 100 parts by weight of a silicone pressure sensitive adhesive; (B) 1-30 parts by weight of an emulsifier selected from the group consisting of a polyvinylalcohol and a polyether modified
(Continued)

(A)

(B)

MQ resin wherein M is R 3SiO 1/2, and Q is SiO 4/2, wherein R represents C 1-20 alkyl; (C) water; and (D) catalyst.

22 Claims, 1 Drawing Sheet

(56) References Cited

U.S. PATENT DOCUMENTS

| | | | | |
|---|---|---|---|---|
| 4,762,640 | A * | 8/1988 | Schiefer | B01D 19/0409 |
| | | | | 516/118 |
| 4,791,029 | A | 12/1988 | Fau et al. | |
| 4,870,149 | A | 9/1989 | Hara et al. | |
| 4,954,554 | A | 9/1990 | Bunge | |
| 4,961,877 | A * | 10/1990 | Shimizu | B01D 19/0409 |
| | | | | 516/118 |
| 5,095,067 | A | 3/1992 | Hara et al. | |
| 5,264,278 | A | 11/1993 | Mazurek et al. | |
| 5,486,578 | A | 1/1996 | Carpenter, II et al. | |
| 5,612,400 | A * | 3/1997 | Gross | C08L 83/00 |
| | | | | 524/268 |
| 5,747,567 | A * | 5/1998 | Traver | C08F 8/42 |
| | | | | 524/110 |
| 5,777,017 | A | 7/1998 | Funk et al. | |
| 6,545,086 | B1 | 4/2003 | Kosal | |
| 6,737,444 | B1 * | 5/2004 | Liu | C08J 3/07 |
| | | | | 516/55 |
| 7,879,943 | B2 * | 2/2011 | Osawa | C08G 77/44 |
| | | | | 516/53 |
| 2003/0065086 | A1 * | 4/2003 | Kosal | C08J 3/03 |
| | | | | 524/588 |
| 2003/0108498 | A1 * | 6/2003 | Stephens | A61K 8/89 |
| | | | | 424/63 |
| 2007/0203307 | A1 | 8/2007 | Cavaleiro et al. | |
| 2010/0284941 | A1 * | 11/2010 | Ivanova | A61K 8/046 |
| | | | | 424/47 |
| 2011/0287267 | A1 | 11/2011 | Hori et al. | |
| 2011/0294714 | A1 * | 12/2011 | Delbrassinne | B01D 19/0404 |
| | | | | 510/343 |
| 2013/0330562 | A1 | 12/2013 | Irifune et al. | |
| 2014/0350176 | A1 * | 11/2014 | Fisher | C08G 77/46 |
| | | | | 524/588 |
| 2014/0371317 | A1 * | 12/2014 | Aliyar | C08L 71/02 |
| | | | | 514/567 |
| 2015/0157724 | A1 | 6/2015 | Cauvin et al. | |
| 2015/0197625 | A1 | 7/2015 | Osawa | |

FOREIGN PATENT DOCUMENTS

| | | |
|---|---|---|
| CN | 103484017 A | 1/2014 |
| DE | 2449085 A1 | 4/1976 |
| EP | 0644246 B1 | 11/1999 |
| EP | 1826243 A2 | 8/2007 |
| JP | H07331220 A | 12/1995 |
| JP | 3516410 B2 | 1/2004 |
| JP | 2006515383 A | 5/2006 |
| JP | 4761049 B2 | 8/2011 |
| JP | 2015134846 A | 7/2015 |
| JP | 2015526556 A | 9/2015 |
| WO | WO9216591 A1 | 10/1992 |
| WO | WO03029381 A1 | 4/2003 |
| WO | WO2014019840 A2 | 2/2014 |

OTHER PUBLICATIONS

PCT/CN2015/082276 International Search Report dated Sep. 30, 2015, 4 pages.

English language abstract and machine translation for JPH07331220 (A) extracted from http://worldwide.espacenet.com database on Jan. 12, 2017, 13 pages.

English language abstract and machine translation for CN101177596 (A) extracted from http://worldwide.espacenet.com database on Jan. 12, 2017, 9 pages.

English language abstract and machine translation for JP4761049 (B2) extracted from http://worldwide.espacenet.com database on Jan. 12, 2017, 35 pages.

English language abstract and machine translation for JP3516410 (B2) extracted from http://worldwide.espacenet.com database on Jan. 26, 2017, 13 pages.

* cited by examiner

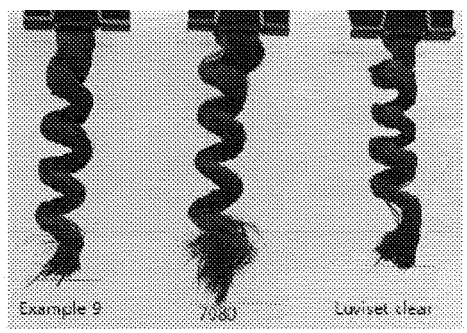 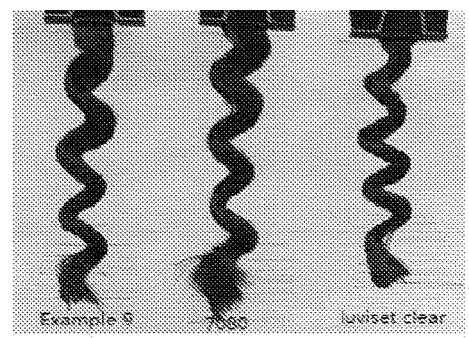
(A)                      (B)

EMULSION TYPE SILICONE PRESSURE SENSITIVE ADHESIVE COMPOSITION AND PROCESS FOR THE PRODUCTION THEREOF

CROSS-REFERENCE TO RELATED APPLICATIONS

This application is the National Stage of International Application No. PCT/CN2015/082276 filed on 25 Jun. 2015, which claims priority to and all advantages of International Application No. PCT/CN2014/080788 filed on 26 Jun. 2014, the content of which is hereby incorporated by reference.

TECHNICAL FIELD

The present invention relates to an emulsion type silicone pressure sensitive adhesive (PSA) composition and a process for the production thereof.

A pressure sensitive adhesive (PSA) is an adhesive product which bonds to a substrate when pressure is applied to marry the adhesive product with the substrate. Usually, no solvent, water, or heat is needed to activate the adhesive. The degree of bond is influenced by the amount of pressure which is used to apply the adhesive to the surface. PSAs are usually designed to form a bond and hold properly at room temperatures.

A polysiloxane, usually named silicone, contains several Si—O—Si— bonds forming a polymeric chain, with —(Si—O)— as repeating unit. A silicone can contain at least one of the following units: M unit (mono-functional), D unit (di-functional), T unit (tri-functional), Q unit (tetra-functional). A silicone containing at least one T and/or Q unit is often called a resin. An MQ resin is a silicone containing at least one M unit and at least one Q unit. A M unit has the formula $R_3SiO_{1/2}$ where R represents an organic (C containing) substituent. All R can be the same or different. R is for example C1-20 alkyl. A Q unit has the formula $SiO_{4/2}$.
An emulsion composition contains water, at least one component and at least one surfactant (emulsifier).

In particular, this invention relates to an emulsion type silicone pressure sensitive adhesive which comprises (A) silicone PSA composition containing less or no solvent; (B) polyvinylalcohol (PVA) or polyether modified MQ (wherein M is $R_3SiO_{1/2}$, and Q is $SiO_{4/2}$, wherein R represents $C_{1-20}$ alkyl) resin as an emulsifier, and (C) water. The final composition usually further comprise (D) catalyst, including Pt catalyst emulsion or amino silane or peroxide. The obtained PSA emulsion can be used for industrial tape, healthcare or personal care applications.

BACKGROUND ART

Compared with solvent based silicone PSA, emulsion type silicone PSA is very attractive from safety and environment perspectives. However limited public reports were found in the prior art.

For example, JP 3516410 (Patent Reference 1, incorporated herein for reference) reported Pt or peroxide cured PSA emulsion. In the embodiments thereof, silicone PSA composition was heat bodied and the solvent was then removed. The following emulsification was carried out with traditional organic surfactant. However, the catalyst needed emulsifying with PSA composition just before use which was actually inconvenient for practical use.

For example, JP 4761049 (Patent Reference 2, incorporated herein for reference) prepared the emulsion of each PSA component (e.g. diorganopolysiloxane) emulsion and resin emulsion and mixed together to get final PSA emulsion. Although peroxide catalyst emulsion was directly used in this patent, the stability or availability of peroxide emulsion was a doubt.

For example, CN 101177596 (Patent Reference 3, incorporated herein for reference) also reported a silicone PSA emulsion composed of MQ resin emulsion, silicone gum emulsion, silane and organic tin catalyst. However, this patent emphasizes the use of organic tin catalyst, which is not preferred because of environmental reasons. The process described was also complex and limited the formulation freedom.

For example, U.S. Pat. No. 6,545,086 (Patent Reference 4, incorporated herein for reference) reported a silicone PSA emulsion prepared by dispersing PSA composition in volatile silicone fluid and emulsifying with surfactant. It also mentioned the method to reduce volatile content. However, with traditional organic surfactants the reported particle size of the emulsion was big and also there was no performance data to support its use as PSA.

Therefore, there still exists a need in the art for obtaining practically useful, safe and environmentally-friendly emulsion type silicone pressure sensitive adhesive which has small particle size, good appearance, stability and peel adhesion, and, compared with peroxide curing of the prior art, the obtained PSA emulsion can be directly mixed with amino silane or platinum emulsion just before use without necessity for pre-emulsifying.

SUMMARY OF THE INVENTION

The present invention was pursued in order to overcome the defects of prior art cited above and has an object of providing a novel emulsion type silicone pressure sensitive adhesive composition for industrial tape, healthcare or personal care application. Another object of the present invention is to provide a process for the production of the emulsion type silicone pressure sensitive adhesive composition.

To overcome the above existing defects, this invention discloses an emulsion type silicone PSA comprising: (A) silicone PSA adhesive; (B) polyvinylalcohol or polyether modified MQ resin as an emulsifier; (C) water; and (D) Pt emulsion or amino silane as a catalyst. The obtained emulsion had small particle size, good appearance, stability and peel adhesion especially for polyether modified MQ resin emulsified PSA. Compared with peroxide curing of the prior art, the obtained PSA emulsion can be directly mixed with amino silane or Pt emulsion just before use without necessity for pre-emulsifying. Compared with emulsions containing traditional nonionic emulsifiers e.g. ethoxylated fatty alcohol, emulsions according to the invention can show significantly improved anchorage to the substrate.

DISCLOSURE OF THE INVENTION

The objects cited above can be achieved by the following:
{1} An emulsion type silicone pressure sensitive adhesive composition, comprising:
(A) 100 parts by weight of a silicone pressure sensitive adhesive;
(B) 1-30 parts by weight of an emulsifier selected from the group consisting of a polyvinylalcohol and a polyether modified MQ resin wherein M is $R_3SiO_{1/2}$, and Q is $SiO_{4/2}$, wherein R represents $C_{1-20}$ alkyl;

(C) water; and (D) catalyst.

{2} The emulsion type silicone pressure sensitive adhesive composition according to {1}, characterized in that the silicone pressure sensitive adhesive (A) comprises:

(A1) an addition type silicone pressure sensitive adhesive comprising (i) an organopolysiloxane having one or more of alkenyl unsaturated groups, (ii) optionally a MQ silicone resin wherein M is $R_3SiO_{1/2}$, and Q is $SiO_{4/2}$, wherein R represents $C_{1-20}$ alkyl, the number ratio of M to Q being in the range of 0.5-1.2, and (iii) an organohydrogen polysiloxane, wherein the ratio of (ii) to (i) is 0.5-2, or (A2) a condensation type silicone pressure sensitive adhesive comprising (i') an organopolysiloxane having one or more of hydroxy groups and (ii') optionally a MQ resin wherein M is $R_3SiO_{1/2}$, and Q is $SiO_{4/2}$, wherein R represents $C_{1-20}$ alkyl, the number ratio of M to Q being in the range of 0.5-1.2, wherein the ratio of (ii') to (i') is 0.5-2.

In some embodiments, the PSA composition is free of MQ silicone resin (ii) or (ii').

For an addition type PSA composition, the organopolysiloxane (i) can be a mixture of 2 or more different organopolysiloxanes having alkenyl groups, for example vinyl groups, each of these organopolysiloxane having a viscosity comprised between 100 and 10000000 cSt (10 million) at room temperature.

{3} The emulsion type silicone pressure sensitive adhesive composition according to {1}, characterized in that the silicone pressure sensitive adhesive (A) further contains 0-20 wt % of dilute agents, based on the total weight of the component (A).

{4} The emulsion type silicone pressure sensitive adhesive composition according to {1}, characterized in that the emulsifier (B) further comprises an organic surfactant.

{5} The emulsion type silicone pressure sensitive adhesive composition according to {1}, characterized in that the catalyst (D) is: a platinum emulsion, an amino silane or a peroxide.

{6} The emulsion type silicone pressure sensitive adhesive composition according to {1}, characterized in further comprising (E) a thickener.

{7} The emulsion type silicone pressure sensitive adhesive composition according to {3}, characterized in that the dilute agents comprise: toluene, xylene, ethylbenzene, ethanol, capric triglycerides, $C_{12}$-$C_{15}$ alkyl benzoate, isododecane, isohexadecane, volatile siloxane cylics or low viscosity siloxanes.

{8} The emulsion type silicone pressure sensitive adhesive composition according to {7}, characterized in that the volatile siloxane cylics comprise: octamethyl tetrasiloxane, decamethyl pentasiloxane or dodemethyl hexasiloxane.

{9} The emulsion type silicone pressure sensitive adhesive composition according to {7}, characterized in that the low viscosity siloxanes comprise: dimethicone with viscosity 2 cSt, 5 cSt or 50 cSt, phenyl trimethicone, or caprylyl methicone.

{10} The emulsion type silicone pressure sensitive adhesive composition according to {4}, characterized in that the organic surfactant comprises: polyethyleneoxide $C_{1-20}$alkyl ether.

{11} A process for the production of an emulsion type silicone pressure sensitive adhesive composition, comprising: mixing (A) 100 parts by weight of a silicone pressure sensitive adhesive, with (B) 1-30 parts by weight of an emulsifier selected from the group consisting of a polyvinylalcohol and a polyether modified MQ resin wherein M is $R_3SiO_{1/2}$, and Q is $SiO_{4/2}$, wherein R represents $C_{1-20}$ alkyl, and adding (C) water while shearing to form an emulsion.

{12} A process for the production of an emulsion type silicone pressure sensitive adhesive composition, comprising: mixing (B) 1-30 parts by weight of an emulsifier selected from the group consisting of a polyvinylalcohol and a polyether modified MQ resin wherein M is $R_3SiO_{1/2}$, and Q is $SiO_{4/2}$, wherein R represents $C_{1-20}$ alkyl, with (C) 5-500 parts by weight of water to form a thick phase, and loading (A) 100 parts by weight of a silicone pressure sensitive adhesive slowly while shearing to form an emulsion, optionally followed by further dilution with water.

{13} The process according to {11} or {12}, further comprising the following step: the obtained emulsion is heated and vacuumed with removal of the dilute agent if necessary, provided that the dilute agents are present, while adding water to the emulsion to compensate for water which is removed.

{14} The use of the emulsion type silicone pressure sensitive adhesive composition according to any of {1} to {10} for an industrial tape, healthcare or personal care products.

ADVANTAGEOUS EFFECT

The present invention can produce one or more of the following technical effects:

Obtaining practically useful, safe and environmentally-friendly emulsion type silicone pressure sensitive adhesive which has small particle size, good appearance, stability and peel adhesion.

Compared with peroxide curing of the prior art, the obtained PSA emulsion can be directly mixed with amino silane or Pt emulsion just before use without necessity for pre-emulsifying.

This results in the application use of:
i) Industrial tape and/or
ii) Healthcare application and/or
iii) Personal care application.

BRIEF DESCRIPTION OF FIGURES

FIG. 1 shows the comparison results of styling performance on hair among PSA emulsion of Example 9, CE-7080 from Dow Corning and Luviset clear from BASF according to Example 10 of the present application, wherein (A) shows the case of T=0, and (B) shows the case of T=5 hours.

BEST MODE FOR CARRYING OUT THE INVENTION

The novel emulsion type silicone pressure sensitive adhesive composition of the present invention comprises (A) a silicone pressure sensitive adhesive, (B) an emulsifier, (C) water and (D) catalyst.

In this invention, component (A) comprises:

(A1) an addition type silicone pressure sensitive adhesive composed of (i) an organopolysiloxane having one or more of alkenyl unsaturated groups, (ii) optionally a MQ silicone resin wherein M is $R_3SiO_{1/2}$, and Q is $SiO_{4/2}$, wherein R represents $C_{1-20}$ alkyl, preferably $C_{1-6}$ alkyl, the number ratio of M to Q being in the range of 0.5-1.2, and (iii) an organohydrogen polysiloxane, wherein the ratio of (ii) to (i) is 0.5-2, or (A2) a condensation type silicone pressure sensitive adhesive comprising (i') an organopolysiloxane having one or more of hydroxy groups and optionally (ii') a MQ resin wherein M is $R_3SiO_{1/2}$, and Q is $SiO_{4/2}$, wherein R represents $C_{1-20}$ alkyl, preferably $C_{1-6}$ alkyl, the number ratio of M to Q being in the range of 0.5-1.2, wherein the ratio of (ii') to (i') is 0.5-2.

In this invention, component (A) may further contain 0-20 wt %, preferably 10-15 wt % of dilute agents, based on the total weight of the component (A). The dilute agents include, but are not limited to: toluene, xylene, ethylbenzene, ethanol, capric triglycerides, $C_{12}$-$C_{15}$ alkyl benzoate, isododecane, isohexadecane, volatile siloxane cyclics, or low viscosity polysiloxanes. The volatile siloxane cyclics include, but not limited to octamethyl tetrasiloxane, decamethyl pentasiloxane or dodecamethyl hexasiloxane. The low viscosity polysiloxanes include, but not limited to dimethicone with viscosity 2 cSt, 5 cSt or 50 cSt, phenyl trimethicone, or caprylyl methicone.

In this invention, component (B) is an emulsifier selected from the group consisting of a polyvinylalcohol and a polyether modified MQ resin wherein M is $R_3SiO_{1/2}$, and Q is $SiO_{4/2}$, wherein R represents $C_{1-20}$ alkyl, preferably $C_{1-6}$ alkyl.

Component (B) is present in an amount of 1-30 parts by weight, preferably 2-15 parts by weight, based on 100 parts by weight of component (A).

In this invention, component (B) may further comprise 20-80 wt %, preferably 40-60 wt % of an organic surfactant, based on the total weight of the component (B). The organic surfactant includes, but is not limited to: polyethyleneoxide $C_{1-20}$alkyl ether.

In this invention, the emulsion type silicone pressure sensitive adhesive composition may further comprise (D) a catalyst.

In this invention, the catalyst (D) is preferably a platinum emulsion, preferably with the effective platinum catalyst amount of 10-200 ppm, more preferably 20-100 ppm, based on the weight of component (A).

In this invention, the catalyst (D) is preferably an amino silane, preferably present in an amount of 1-5 parts by weight, more preferably 2-3 parts by weight, based on 100 parts by weight of component (A).

In this invention, the catalyst (D) can be a peroxide, present in an amount of 1-5 parts by weight, preferably 2-4 parts by weight, based on the weight of component (A). Preferably, the composition is free of peroxide.

In this invention, the emulsion type silicone pressure sensitive adhesive composition may further comprise (E) a thickener.

In this invention, the thickener (E) includes, is but not limited to: xanthan gum, and hydroyxyalkyl cellulose.

A process for the production of the novel emulsion type silicone pressure sensitive adhesive composition of the present invention may comprise: mixing (A) 100 parts by weight of the silicone pressure sensitive adhesive, with (B) 1-30 parts by weight of the emulsifier, and adding (C) water while shearing to form the emulsion.

A process for the production of the novel emulsion type silicone pressure sensitive adhesive composition of the present invention may comprise: mixing (B) 1-30 parts by weight of the emulsifier, with (C) 5-500 parts by weight of water to form a thick phase, and loading (A) 100 parts by weight of the silicone pressure sensitive adhesive slowly while shearing to form the emulsion, optionally followed by further dilution with water.

In this invention, the process may further comprise the following step: the obtained emulsion is heated and vacuumed with removal of dilute agents if necessary, while adding water to the emulsion to compensate for water which is removed.

Component (C), water, is main component of aqueous phase of our inventive emulsion type silicone pressure sensitive adhesive composition, and exemplified as tap water, purified water, mineral water and the like. In addition, in the aqueous emulsion of the present invention, optional components which are water-soluble or water-dispersible may be previously blended in the water phase or added directly after emulsion preparation unless such component impairs the effect of this invention.

EXAMPLES

Examples are given below in order to specifically describe the present invention; however, the present invention is not limited to the examples that follow. In the examples that follow, parts are weight parts in all instances. Room temperature is usually comprised between 20 and 25 C, for example 20, 21, 22, 23, 24 or 25 C, preferably 20 C or 25 C. Dimethicone is typically di-functional polydimethylsiloxane. Viscosity values are measured at room temperature. Low viscosity usually means less than 1000 cSt or less than 500 cSt or less than 100 cSt at room temperature.

The PVA used in the examples is GOHSENOL GH-17 from Nippon Gohsei.

Brij 30 and Brij 35 are ethoxylated fatty alcohols used as nonionic organic emulsifiers.

Example 1 (Preparation of Component (A): Silicone Pressure Sensitive Adhesive)

Procedure:
24 parts of polydimethylsiloxane, vinyl terminated, of viscosity of about 450 cst and vinyl content of 0.46% was mixed with 67 parts of MQ resin/xylene (66/34) solution, of M/Q ratio of about 1 (wherein M is $(CH_3)_3SiO_{1/2}$, and Q is $SiO_2$), after heating and vacuum stripping solvent, 5.5 parts of organohydrogen polysiloxane, of viscosity of 5 cst and SiH content of 0.76% were loaded to form a pressure sensitive adhesive.

Example 2 (Practical)

Preparation of PSA Emulsion:
1 g PVA was mixed with 5 g water to form a thick phase first. 50 g PSA obtained from Example 1 was slowly added into thick phase while shearing. After all adhesive was added, 24 g water was loaded to get the final PSA emulsion. The final emulsion has the particle size of 0.7 μm (measured by Malvern 2000) and good appearance. The emulsion was also found to keep stable at RT (room temperature) for above 1 year.

Example 3 (Practical)

Performance Test of PSA Emulsion:
Preparation of PSA Tape:
100 g PSA emulsion obtained from Example 2 was mixed with 3.75 g 7975 (platinum emulsion from Dow-Corning) with the effective Pt catalyst of 21 ppm based on silicone composition to form the mixed emulsion which was thereafter coated on PET film of thickness 50 μm or polyimide film of thickness 25 μm and cured at 150° C. for 3 mins.
180° Peel Adhesion:

The above PSA tape was cut by 1 inch width and laminated on SUS (steel use stainless) panel. After 1 hr standby peel PSA film (the tape on substrate) from SUS panel with Adhesion/Release Tester AR-1500 (ChemInstruments). Peel speed and angle were set as 0.3 m/min and 180°.

The 180° peel adhesion was around 800 g/inch for 30-35 um dry coating thickness on PET, indicating that the obtained emulsion has very good peel adhesion.

Cohesion:
Combine two smooth steel panel together by PSA tape (PET) of 1 inch width and 3 inch length without overlap of the two panels; 1 inch was laminated with upper panel and 2 inches was laminated with lower panel. Vertically hang the upper end of laminate in shear oven (ChemInstruments) and 1 kg of load was applied to the lower end of lamination. The gap distance after hanging under a room temperature for 24 hrs was measured with vernier caliper. The test result for above PSA tape is 0 mm, indicating good cohesion for this PSA emulsion.

Heat Resistance:
Combine two smooth steel panel together by PSA tape (polyimide) of 1 inch width and 3 inch length without overlap of the two panels; 1 inch was laminated with upper panel and 2 inches was laminated with lower panel. Vertically hang the upper end of laminate in shear oven (ChemInstruments) and 1 kg of load was applied to the lower end of lamination. The gap distance after hanging at 200° C. for 24 hrs was measured with vernier caliper. The test result for above PSA tape is 0 mm, indicating good heat resistance for this PSA emulsion.

Example 4 (Preparation of Component (A): Silicone Pressure Sensitive Adhesive)

Procedure:
14.1 parts of hydroxyl terminated silicone gum of viscosity lower than 300 cSt, from Dow-Corning), 20.9 parts of hydroxyl terminated polydimethylsiloxane with viscosity of around 80000 cst, 27 parts of 70% MQ resin/xylene solution 1 (wherein M is $(CH_3)_3SiO_{1/2}$, Q is $SiO_2$, and M/Q ratio is 0.75) and 38 parts of 75% MQ resin/xylene solution 2 (wherein M is $(CH_3)_3SiO_{1/2}$, Q is $SiO_{4/2}$, and M/Q ratio is 0.9) were mixed together to get a PSA.

Example 5 (Practical)

Preparation of PSA Emulsion:
1 g PVA was mixed with 5 g water to form a thick phase first. 50 g PSA obtained from Example 4 was slowly added into thick phase while shearing. After all adhesive was added, 17 g water was loaded to get the final PSA emulsion. The average particle size of the emulsion was 4.9 um (measured by Malvern 2000).

Example 6 (Practical)

Performance Test of PSA Emulsion:
Preparation of PSA Tape:
100 g PSA emulsion obtained from Example 5 was mixed with 0.56 g aminoethylaminopropyl trimethoxylsilane to form the mixed emulsion which was thereafter coated on PET film of thickness 50 μm and cured at 160° C. for 3 mins.
180° Peel Adhesion:
The test method is same as that described in Example 3. The 180° peel adhesion was around 550 g/inch for 30-35 um dry coating thickness, indicating that the obtained emulsion has enough peel adhesion.

Cohesion:
The test method is same as that described in Example 3 and the gap distance is 0 mm, suggesting good cohesion.

Example 7 (Practical)

Preparation of PSA Emulsion:
50 g adhesive obtained from Example 4 was mixed with 5 g polyether modified MQ resin (the stripped reaction product derived from heating 1 part of a siloxane consisting essentially of $(CH_3)_3SiO_{1/2}$ units and $SiO_2$ units in which the ratio of $(CH_3)_3SiO_{1/2}$ units to $SiO_2$ units was 0.75, and 3 parts of a hydroxylated polyoxyethylene-polypropylene copolymer having a molecular weight of about 6200 and about a 1:1 mole ratio of ethylene oxide units to propylene oxide units, in 4 parts of xylene employing stannous octoate catalyst) to get a homogeneous mixture. Then 5 g water was added with high shearing to form a thick O/W (oil in water) phase. 13 g water was added next to get the final PSA emulsion. The average particle size of the emulsion was 0.3 um (measured by Malvern 2000), indicating that the obtained emulsion has significantly small particle size, and significantly good appearance. The emulsion was also found to keep stable at RT for above 1 year.

Example 8 (Practical)

Performance Test of PSA Emulsion:
Preparation of PSA Tape:
100 g PSA emulsion obtained from Example 7 was mixed with 0.56 g aminoethylaminopropyl trimethoxylsilane to form the mixed emulsion which was thereafter coated on PET film of thickness 50 μm and cured at 160° C. for 3 mins.
180° Peel Adhesion:
The test method is same as that described in Example 3. The 180° peel adhesion was around 1000 g/inch for 30-35 um dry coating thickness, indicating that the obtained emulsion has significantly good peel adhesion.

Example 9 (Practical)

100 g emulsion of Example 7 was heated to 50° C. and stripped solvent at pressure of 0.2 bar. During stripping process especially when emulsion got concentrated some water was added to compensate for lost water. The volatile of final emulsion was around 0.4%.

Example 10 (Practical)

Styling Performance on Hair:
Two kinds of styling products were compared with current PSA emulsion. One was organic styling polymer which usually had good styling effect but poor hand feeling, represented by Luviset clear from BASF. The other was amino elastomer emulsion which usually had good hand feeling and enough styling effect but more expensive, represented by CE-7080, from Dow Corning.

PSA emulsion of Example 9, CE-7080 and Luviset clear were respectively diluted into water to get styling solutions with equivalent active (0.6%). Dip the hair tress in above styling solution for 30 sec and leave them to hang for 5 minutes. Then curl each tress with rod spiral curler according to same procedure. Hang the hair tresses in the chamber with constant humidity (70%) and temperature (25° C.). Hand feeling and curling retention % (curling retention $\%=(L_M-L_t)/(L_M-L_0)*100$; $L_M$: maximum length of hair tress; $L_0$: initial hair tress length after curling; $L_t$: hair tress length at different time) were used to characterize the styling performance.

PSA emulsion of Example 9 showed better hand feeling than organic benchmark, better initial styling effect (See FIG. 1(A) T=0) and similar styling durability compared with CE-7080. The following table shows the comparison results.

| Sample name | Hand feeling on hair | Curling retention after 5 Hrs (%) |
|---|---|---|
| Example 9 | a little hard | 56.9 |
| CE-7080 (Dow Corning) | soft | 57.8 |
| Luviset clear (BASF) | hard | 65.9 |

Example 11 (Practical)

Gel Eye Liner Formulation

| | | Trade Name/Supplier | Wt. % |
|---|---|---|---|
| | Phase A | | |
| 1. | Deionized Water | | 65.8 |
| 2. | Aminomethyl Propanol | AMP-Ultra PC 1000/The Dow Chemical Company | 0.4 |
| 3. | Acrylates Copolymer | Viscolam MAC 10/Lamberti | 4 |
| 4. | Propanediol | Zemea/DuPont Company | 2 |
| 5. | Alcohol Denatured | Ethyl Alcohol Absolute/No Supplier Specified | 1 |
| | Phase B | | |
| 6. | PSA Emulsion from Example 9 | | 6 |
| 7. | Isododecane (and) Acrylates/Polytrimethylsiloxymethacrylate | DOW CORNING ® FA 4002 ID SILICONE ACRYLATE | 5 |
| 8. | Phenoxyethanol (and) Methylparaben (and) Ethylparaben | Saliguard MEPX/Salicylates and Chemicals | 0.8 |
| 9. | Calcium Aluminum Borosilicate (and) Titanium Dioxide | Creastar/The Innovation Company | 15 |

Procedure
1. Cold Process: Premix phase A in given order and stir until a clear gel is obtained. Add ingredients of phase B in given order. Stir until a homogeneous gel is obtained.

Example 12 (Practical)

Sun Cream Formulation

| | | Trade Name/Supplier | Wt. % |
|---|---|---|---|
| | Phase A | | |
| 1. | Lauryl PEG/PPG-18/18 Methicone | DOW CORNING ® 5200 FORMULATION AID | 3 |
| 2. | Dimethicone (and) Trisiloxane | XIAMETER ® PMX-1184 SILICONE FLUID | 16 |
| 3. | PSA Emulsion Example 9 | | 4 |
| 4. | Ethylhexyl Methoxycinnamate | Parsol MCX/DSM Nutritional Products | 7 |
| 5. | Zinc Oxide (and) Dimethicone | Z-Cote HP-1/BASF Corporation | 5 |
| | Phase B | | |
| 6. | Butylene Glycol/Sea Parsley Extract | Sea Parsley/Collaborative Group | 0.5 |
| 7. | Sodium Chloride | | 2 |
| 8. | Polysorbate 20 | Tween 20/Croda | 0.4 |
| 9. | Water (and) | Melarrest/Collaborative lab | 3 |

| | | Trade Name/Supplier | Wt. % |
|---|---|---|---|
| 10. | cyclomethicone (and) Licorice extract Water | (and) Butylene glycol (and) Phospholipids | 58.4 |
| | Phase C | | |
| 11. | Propylene Glycol (and) Diazolidinyl Urea | Liquid Germall Plus/ISP (and) Iodopropynyl Butylcarbamate | 0.5 |
| 12. | Perfume (choice) | | 0.2 |

Procedure
1. Mix ingredients of phase A (except zinc oxide).
2. Mix ingredients of phase B together.
3. Before emulsification add Z-cote to phase A and mix until homogenous.
4. Slowly add phase B to phase A with turbulent mixing.
5. Depending on sample size the addition of water phase should be up to 10 min.
6. Add phase C with mixing.
7. Continue mixing for an additional 15 minutes.

Example 13 (Preparation of Component (A): Silicone Pressure Sensitive Adhesive)

Procedure:

6 parts of vinyl terminated silicone gum with Mw 700000 dalton, 0.01% vinyl, 4.5 parts of vinyl terminated, dimethyl, methylvinyl silicone gum with Mw 700000 dalton, 0.2% vinyl silicone gum and 65 parts of vinyl terminated dimethylsiloxane of 10000 mpa·s, 0.1% vinyl were mixed with 0.75 parts of trimethylsiloxy terminated, dimethyl, methylhydrogen siloxane with 0.92% H of viscosity lower than 85 sCt and 0.1 parts of ethynyl cyclyhexanol to get a PSA.

Example 14 (Preparation of PSA Emulsion)

Preparation of PSA Emulsion:

1 g PVA was mixed with 5 g water to form a thick phase first. 25 g PSA obtained from Example 1 was slowly added into thick phase while shearing. After all adhesive was added, 9 g water was loaded to get the final PSA emulsion. The average particle size of the emulsion was 0.9 um (measured by Malvern 2000).

Example 15 (Performance Test of PSA Emulsion)

Preparation of PSA Tape:
100 g PSA emulsion obtained from Example 14 was mixed with 7 g 7975 (platinum emulsion from Dow-Corning) with the effective Pt catalyst of 40 ppm based on silicone composition to form the mixed emulsion which was thereafter coated on PET film of thickness 50 μm and cured at 150° C. for 1.5 mins.
180° Peel Adhesion:
The above PSA tape was cut by 1 inch width and laminated on glass panel. After 24 hr standby peel PSA film (the tape on substrate) from glass panel with Adhesion/Release Tester AR-1500 (Chem Instruments). Peel speed and angle were set as 0.3 m/min and 180°.
The 180° peel adhesion was around 2 g/inch for 15 um dry coating thickness on PET.

Comparative Example 2' (Preparation of PSA Emulsion)

Preparation of PSA Emulsion:
1 g Brij30 (from Croda) and 1 g Brij35 (from Croda) were mixed with 2 g water to form a thick phase first. 50 g PSA obtained from Example 1 was slowly added into thick phase while shearing. After all adhesive was added, 8.5 g water was loaded to get the final PSA emulsion. The average particle size of the emulsion was 0.5 um (measured by Malvern 2000).

Comparative Example 3' (Performance Test of PSA Emulsion)

100 g PSA emulsion obtained from comparative Example 2' was mixed with 9 g platinum emulsion with the effective Pt catalyst of 40 ppm based on silicone composition to form the mixed emulsion which was thereafter coated on PET film of thickness 50 μm and cured at 150° C. for 1.5 minute. It was found that the final cured coating was easily to be peeled off from PET substrate suggesting poor anchorage performance.

INDUSTRIAL APPLICABILITY

With said emulsion type silicone pressure sensitive adhesive composition according to the present invention, a practically useful, safe and environmentally-friendly emulsion type silicone pressure sensitive adhesive which has small particle size, good appearance, stability and peel adhesion could be obtained. The industrial applicability covers almost all potential use of emulsion type silicone pressure sensitive adhesive, especially for industrial tape, healthcare or personal care application.

The invention claimed is:

1. An emulsion type silicone pressure sensitive adhesive composition comprising:
(A) 100 parts by weight of a silicone pressure sensitive adhesive;
(B) 1-30 parts by weight of a polyether modified MQ resin;
(C) water; and
(D) catalyst.

2. The emulsion type silicone pressure sensitive adhesive composition according to claim 1, wherein the silicone pressure sensitive adhesive (A) comprises:
(A1) an addition type silicone pressure sensitive adhesive comprising;
(i) an organopolysiloxane having one or more of alkenyl unsaturated groups,
(ii) optionally a MQ silicone resin, wherein M is $R_3SiO_{1/2}$, Q is $SiO_{4/2}$, R represents a $C_{1-20}$ alkyl group, and the number ratio of M to Q is in the range of 0.5-1.2, and
(iii) an organohydrogen polysiloxane, wherein the ratio of (ii) to (i) is 0.5-2; or
(A2) a condensation type silicone pressure sensitive adhesive comprising;
(i') an organopolysiloxane having one or more of hydroxy groups, and
(ii') optionally a MQ resin, wherein M is $R_3SiO_{1/2}$, Q is $SiO_{4/2}$, R represents a $C_{1-20}$ alkyl group, the number ratio of M to Q is in the range of 0.5-1.2, and the ratio of (ii') to (i') is 0.5-2.

3. The emulsion type silicone pressure sensitive adhesive composition according to claim 2, wherein the silicone pressure sensitive adhesive (A) comprises the addition type silicone pressure sensitive adhesive (A1).

4. The emulsion type silicone pressure sensitive adhesive composition according to claim 2, wherein the silicone pressure sensitive adhesive (A) comprises the condensation type silicone pressure sensitive adhesive (A2).

5. The emulsion type silicone pressure sensitive adhesive composition according to claim 4, wherein the condensation type silicone pressure sensitive adhesive (A2) comprises the organopolysiloxane (i') and the MQ resin (ii').

6. The emulsion type silicone pressure sensitive adhesive composition according to claim 1, wherein the silicone pressure sensitive adhesive (A) further contains greater than 0 to 20 wt % of diluents, based on the total weight of component (A).

7. The emulsion type silicone pressure sensitive adhesive composition according to claim 6, wherein the diluents comprise at least one of toluene, xylene, ethylbenzene, ethanol, capric triglycerides, $C_{12}$-$C_{15}$ alkyl benzoates, isododecane, isohexadecane, volatile siloxane cyclics, or low viscosity siloxanes.

8. The emulsion type silicone pressure sensitive adhesive composition according to claim 7, wherein the diluents are the volatile siloxane cyclics and the volatile siloxane cyclics comprise octamethyl tetrasiloxane, decamethyl pentasiloxane, or dodecamethyl hexasiloxane.

9. The emulsion type silicone pressure sensitive adhesive composition according to claim 7, wherein the diluents are the low viscosity siloxanes and the low viscosity siloxanes comprise: dimethicone with a viscosity of 2 cSt, 5 cSt, or 50 cSt; phenyl trimethicone; or caprylyl methicone.

10. The emulsion type silicone pressure sensitive adhesive composition according to claim 1, wherein component (B) further comprises an organic surfactant.

11. The emulsion type silicone pressure sensitive adhesive composition according to claim 10, wherein the organic surfactant comprises a polyethyleneoxide $C_{1-20}$ alkyl ether.

12. The emulsion type silicone pressure sensitive adhesive composition according to claim 10, wherein component (B) comprises 20-80 wt % of the organic surfactant, based on the total weight of component (B).

13. The emulsion type silicone pressure sensitive adhesive composition according to claim 1, wherein the catalyst (D) is a platinum emulsion, an amino silane, or a peroxide.

14. The emulsion type silicone pressure sensitive adhesive composition according to claim 1, further comprising (E) a thickener.

15. An industrial tape, a healthcare product, or a personal care product comprising the emulsion type silicone pressure sensitive adhesive composition according to claim 1.

16. The emulsion type silicone pressure sensitive adhesive composition according to claim 1, further comprising a polyvinylalcohol.

17. A process for the production of an emulsion type silicone pressure sensitive adhesive composition, said process comprising:
mixing
   (A) 100 parts by weight of a silicone pressure sensitive adhesive, with
   (B) 1-30 parts by weight of a polyether modified MQ resin; and
adding
   (C) water while shearing to form an emulsion.

18. The process according to claim 17, further comprising heating and vacuum stripping the emulsion for removal of diluents if present, and adding water to the emulsion to compensate for water which is removed.

19. The process according to claim 17, wherein a polyvinylalcohol is present while mixing components (A) and (B).

20. A process for the production of an emulsion type silicone pressure sensitive adhesive composition, said process comprising:
mixing
   (B) 1-30 parts by weight of a polyether modified MQ resin, with
   (C) 5-500 parts by weight of water to form a thick phase; and
loading
   (A) 100 parts by weight of a silicone pressure sensitive adhesive slowly while shearing to form an emulsion;
optionally followed by further dilution with water.

21. The process according to claim 20, further comprising heating and vacuum stripping the emulsion for removal of diluents if present, and adding water to the emulsion to compensate for water which is removed.

22. The process according to claim 20, wherein a polyvinylalcohol is present while mixing components (A) and (B).

* * * * *